(12) United States Patent
Momotsu et al.

(10) Patent No.: US 7,894,700 B2
(45) Date of Patent: Feb. 22, 2011

(54) HOLDING MEMBER FOR OPTICAL DISTRIBUTION FRAME AND OPTICAL DISTRIBUTION FRAME

(75) Inventors: Norihiro Momotsu, Sakura (JP); Kazuya Ogata, Sakura (JP); Katsuaki Suzuki, Tsukuba (JP); Shigenori Uruno, Tsukuba (JP); Arata Natsume, Tsukuba (JP)

(73) Assignees: Fujikura Ltd., Tokyo (JP); Nippon Telegraph & Telephone Corp., Tokyo (JP)

( * ) Notice: Subject to any disclaimer, the term of this patent is extended or adjusted under 35 U.S.C. 154(b) by 40 days.

(21) Appl. No.: 12/500,255

(22) Filed: Jul. 9, 2009

(65) Prior Publication Data

US 2010/0104253 A1    Apr. 29, 2010

(30) Foreign Application Priority Data

Oct. 27, 2008    (JP)    ............................. 2008-275089

(51) Int. Cl.
*G02B 6/00*    (2006.01)

(52) U.S. Cl. .................................................... 385/137
(58) Field of Classification Search .................. 385/137
See application file for complete search history.

(56) References Cited

U.S. PATENT DOCUMENTS 7,664,363 B1 *    2/2010    Mowery, Sr. ................. 385/137

FOREIGN PATENT DOCUMENTS

| JP | 2000-329945 A | 11/2000 |
| JP | 3540184 B2 | 4/2004 |

* cited by examiner

*Primary Examiner*—Jerry T Rahll
(74) *Attorney, Agent, or Firm*—Sughrue Mion, PLLC

(57) ABSTRACT

A holding member includes a flared tubular body and collectively holds a plurality of unused optical fibers provided with optical connectors within an optical distribution frame. The tubular body has a rectangular cross section and includes an elongated rectangular lower opening and an upper opening wider than the lower opening. A part of sidewalls of the tubular body is formed to serve as an openable cover. The cover is first opened; the optical fibers provided with the optical connectors are accommodated in the tubular body; and then the cover is closed.

13 Claims, 8 Drawing Sheets

HOLDING MEMBER FOR OPTICAL DISTRIBUTION FRAME AND OPTICAL DISTRIBUTION FRAME

CROSS REFERENCE TO RELATED APPLICATION

This application claims benefit of priority under 35 USC 119 based on Japanese Patent Application No. 2008-275089 filed on Oct. 27, 2008, the entire contents of which are incorporated by reference herein.

BACKGROUND OF THE INVENTION

1. Field of the Invention

The present invention relates to a holding member which holds a plurality of optical fibers provided with optical connectors in an optical distribution frame and an optical distribution frame including the holding member.

2. Description of the Related Art

As a constituent part of an optical distribution frame which performs connection and switching of a number of optical fibers, a connection unit provided with a number of optical connector adaptors on the working-surface side is used.

Optical fibers drawn out of subscriber-side optical fiber cables introduced into the optical distribution frame are usually connected by proper means to different optical fibers (jumper cords) at the connection unit through an optical jumper unit.

The jumper cords are terminated with optical connectors, and some of the optical connectors of optical fibers in use are connected to optical connectors (optical adaptors) of the connection unit.

On the other hand, among the jumper cords, in preparation for an increase in the number of subscribers, unused optical fibers which are not planned to be connected to different fibers at the moment are also accommodated in the optical distribution frame.

The number of the unused optical fibers is very large, and the unused optical fibers are held in a specific area of the optical distribution frame in order to prevent tangle of the fibers. The specific area is for example the back of the door.

Japanese Patent Application Publication No. 2000-329945 (Patent Document 1) discloses a terminal frame provided with a number of connector holding holes to which optical connectors are attached in order to hold the unused optical fibers with optical connectors.

Japanese Patent No. 3540184 (Patent Document 2) discloses holding blocks with a number of holding grooves formed thereon, the holding grooves being fit to individual protective boots of the optical connectors attached to the unused optical fibers. These holding blocks are arranged in an orderly fashion and are rotatably attached to a body of a rectangular holding frame with hinges. These holding blocks can be drawn out by rotation.

To put optical fibers with optical connectors together, generally, a box-shaped optical connector holding part to put optical connectors together is used.

SUMMARY OF THE INVENTION

The aforementioned optical connector holding part is formed into a box shape surrounded by walls. Accordingly, to accommodate a large number of optical connectors of the unused optical fibers, it is necessary to align ends of the optical connectors. The workability in accommodating the optical fibers is therefore not always good.

Moreover, the optical connector holding part requires a capacity equal to or more than the total volume of the optical connectors to be accommodated. However, to improve the workability, the optical connector holding part requires wide accommodation space with a capacity several times larger than the total volume. In other words, when the accommodation space cannot be changed, the number of unused optical fibers which can be held is limited.

In Patent Document 1 above, the optical connectors of the unused optical fibers are individually attached to the respective connector holding holes. On the other hand, in Patent Document 2, the optical connectors of the unused optical fibers are individually fit to the respective holding grooves. Any of these unused optical fiber holders can align and hold the individual optical connectors of the unused optical fibers in an orderly fashion. However, the workability in attaching the optical connectors to the connector holding holes or grooves is poor, and moreover, the connector holding holes or grooves have a limit in holding a number of unused optical fibers.

The present invention was made in the light of the aforementioned background, and an object of the present invention is to provide a holding member allowing a number of unused optical fibers to be easily held in a narrow limited space in an orderly fashion with a simple structure.

A first aspect of the present invention is a holding member for holding a plurality of optical fibers provided respectively with optical connectors within an optical distribution frame. The holding member includes: a tubular body having: a first opening configured to allow the optical fibers to pass through the first opening; a second opening having an opening area smaller than that of the first opening; and a side opening connecting the first and second openings. The tubular body is flared so that an accommodation area of the optical fibers increases from the second opening towards the first opening. The second opening has a width smaller than that of each of the optical connectors.

Preferably, the tubular body is composed of four sidewalls, and the four sidewalls are provided to define a cross-section of the tubular body into a rectangle. Furthermore, preferably, among the four sidewalls, a first pair of the two sidewalls face each other and have a width equal to a length of long sides of the second opening, and among the four sidewalls, a second pair of the two sidewalls face each other and have a width larger than a length of short sides of the second opening. More preferably, distance between the first pair of two sidewalls increases from the second opening towards the first opening, and distance between the second pair of two sidewalls is constant.

One of the first pair of two sidewalls may be a vertical wall vertically extending. The other sidewall of the first pair of two sidewalls may be an inclined wall inclined to the vertical wall.

The inclined wall may include an upper inclined surface and a lower inclined surface formed integrally with the upper inclined surface. In this case, preferably, an angle of intersection of a plane including the vertical wall and a plane including the upper inclined surface is smaller than an angle of intersection of the plane including the vertical wall and a plane including the lower inclined surface.

The holding member according to the present invention may further include: a hinge portion that is provided between a sidewall of the second pair of two sidewalls and the vertical wall and that opens and closes the vertical wall with respect to the side opening; and a lock portion locking the other sidewall of the second pair of two sidewalls with the vertical wall. In this case, the lock portion may include: an engagement hole formed in the vertical wall; and a lock claw provided for the other sidewall of the second pair of two sidewalls and locked with the engagement hole.

Preferably, the side opening is a slit inclined to the vertical direction.

Preferably, each of the first pair of two sidewalls includes a guide portion at a bottom thereof, and the guide portions face each other and extend downward while bending outward.

A second aspect of the present invention is a holding member for holding a plurality of optical fibers provided respectively with optical connectors. The holding member includes: a tubular body having: a first opening configured to allow the optical fibers to pass through the first opening; a second opening having an opening area smaller than that of the first opening; and a side opening which is provided to a sidewall of the tubular body and connects the first and second openings. In this case, the tubular body is flared so that an accommodation area for the optical fibers increases from the second opening towards the first opening. At least a part of the side opening is a narrow portion having an opening width which is smaller than a width of each of the optical connectors and larger than a diameter of each of the optical fibers. The second opening has a width smaller than that of each of the optical connectors.

A third aspect of the present invention is a holding member for holding a plurality of optical fibers provided respectively with optical connectors. The holding member includes: a tubular body having: a first opening configured to allow the optical fibers to pass through the first opening; a second opening having an opening area smaller than that of the first opening; and a side opening which is provided to a sidewall of the tubular body and connects the first and second openings; and a cover closing the side opening. The tubular body is flared so that an accommodation area for the optical fibers increases from the second opening towards the first opening. The second opening has a width smaller than that of each of the optical connectors.

A fourth embodiment of the present invention is an optical distribution frame including a holding space where the holding member according to any one of the aforementioned first to third aspects is fixed.

BRIEF DESCRIPTION OF THE DRAWINGS

FIG. 3A being a front view showing the optical distribution frame in which a door-shaped attachment panel with the holding members attached thereto is opened; FIG. 3B being a plan view showing the same state; and FIG. 3C being a front view of the optical distribution frame with the attachment panel being closed.

DETAILED DESCRIPTION OF THE PREFERRED EMBODIMENTS

Hereinafter, a description is given of an optical distribution frame according to the present invention and a holding member for the optical distribution frame with reference to the drawings.

First Embodiment

Figure 1A:
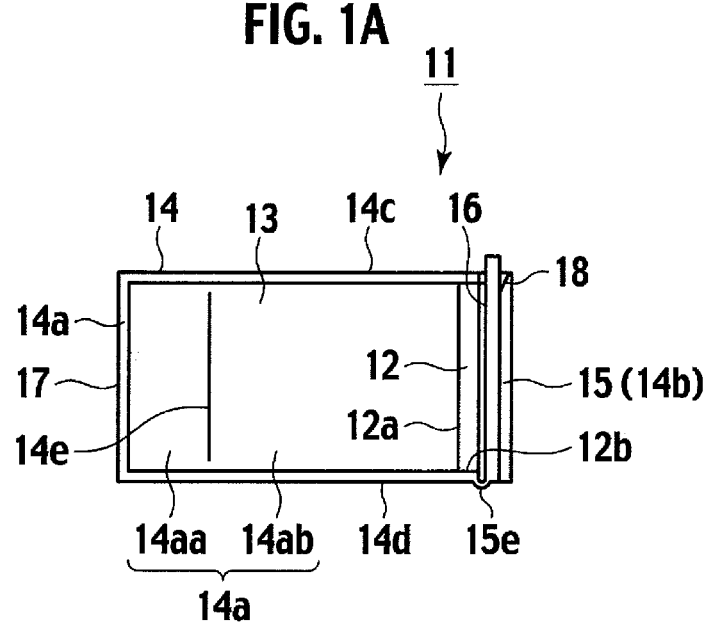
FIGS. 1A to 1C show a holding member according to a first embodiment of the present invention, FIG. 1A to 1C being a plan view, a front view, and a right side view thereof, respectively.
Figure 1B:
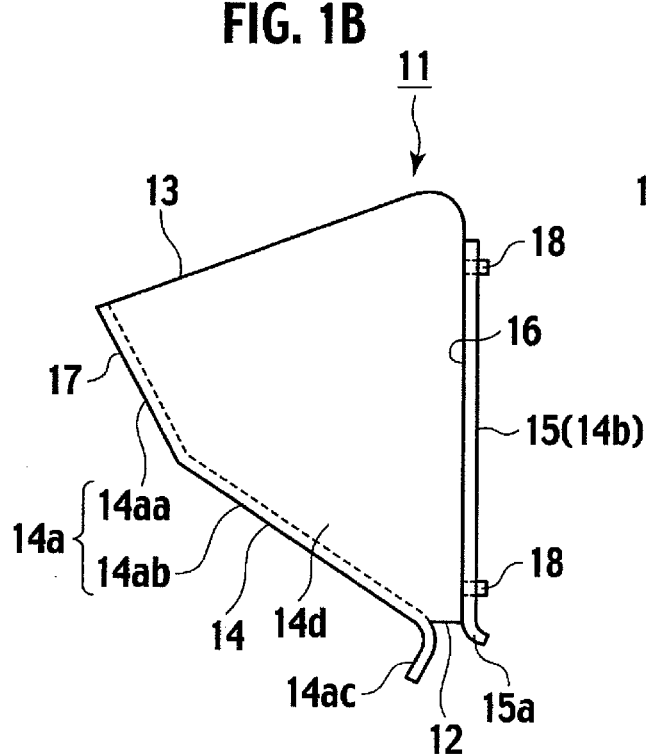
Figure 1C:
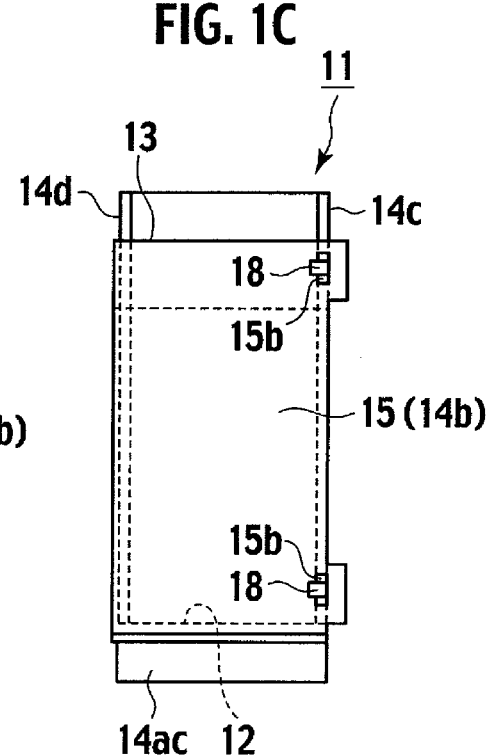
Figure 2:
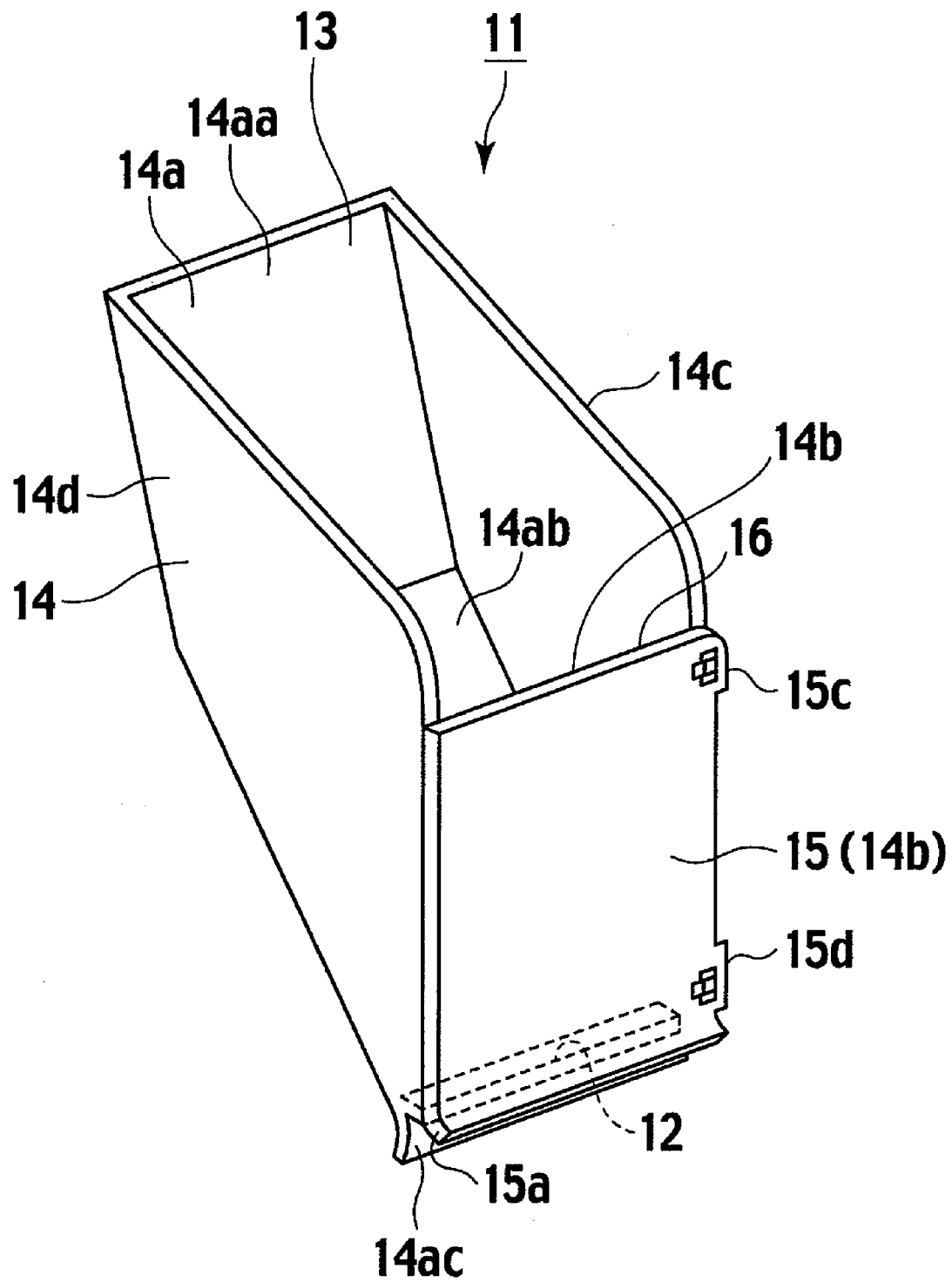
FIG. 2 is a perspective view showing the holding member shown in FIG. 1A.

FIG. 1A is a plan view showing a holding member 11 according to a first embodiment of the present invention. FIGS. 1B and 1C are a front view, and a right side view thereof, respectively. FIG. 2 is a perspective view showing the holding member 11 shown in FIG. 1.

Figure 3A:
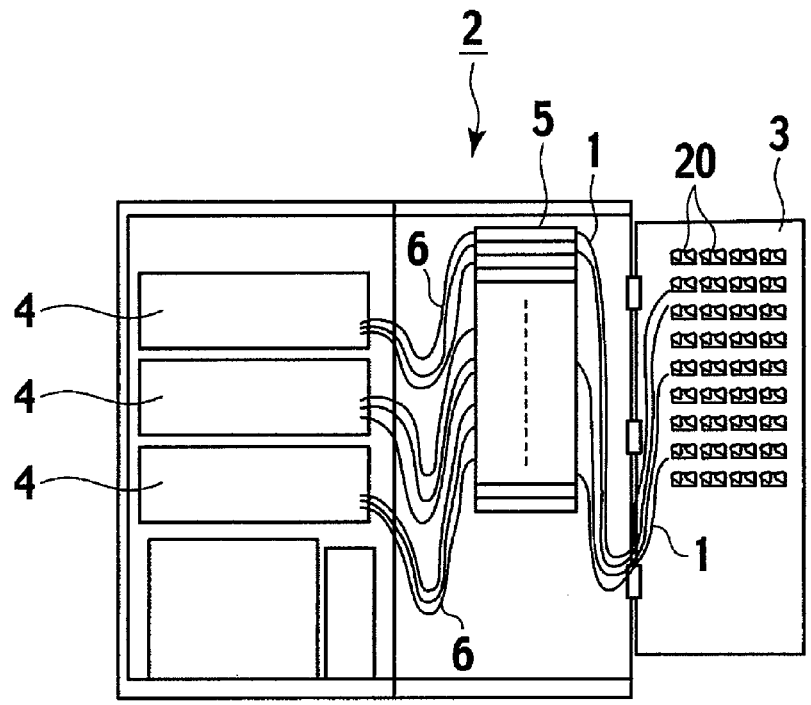
FIGS. 3A to 3C show an example of an optical distribution frame in which the holding members shown in FIG. 1A are mounted.
Figure 3B:
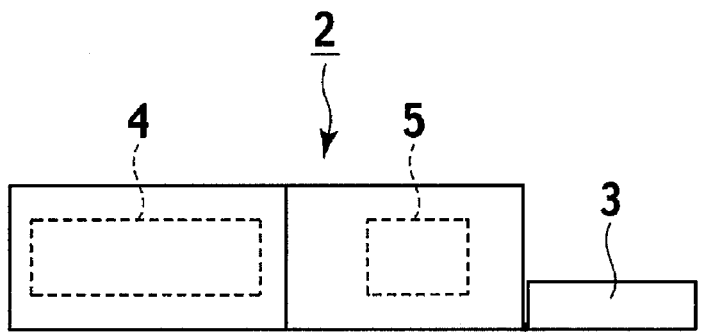
Figure 3C:
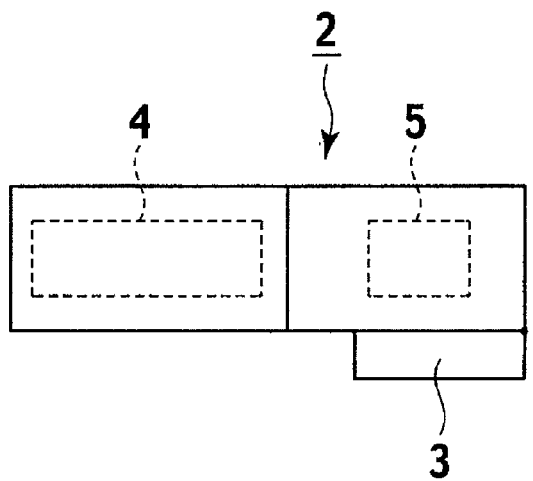

FIGS. 3A to 3C show an example of an optical distribution frame 2 which holds unused jumper cords 1 using the holding members 11 of the present invention. FIG. 3A is a front view showing the optical distribution frame 2 with a door-shaped panel 3 being opened. FIG. 3B is a top plan view showing the optical distribution frame 2. FIG. 3C is a plan view of the optical distribution frame 2 with the panel 3 being closed. In FIGS. 3A to 3C, reference numerals 4, 5, and 6 indicate connection units, an optical jumper unit, and jumper cords already used as communication lines, respectively.

Optical fibers (not shown) taken out from optical cables (not shown) introduced from the outside are connected to ends of other optical fibers in the optical jumper unit 5. This connection is made by means of fusion splicing, optical connectors, or the like. The above "other optical fibers" are sometimes also called jumper cords. Hereinafter, this term is used in this application for convenience.

Figure 8:
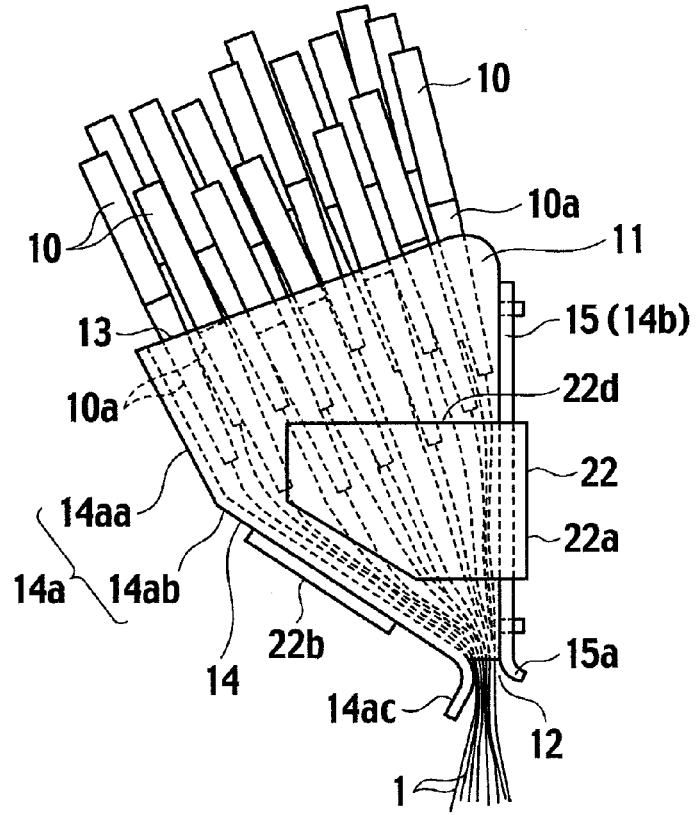
FIG. 8 is a view showing the holding member which is attached to the attachment base in the attachment base of FIG. 5 and accommodates a number of optical connectors.

The other ends of the jumper cords 1 and 6 are connected to optical connectors 10 (see FIG. 8). For establishing communication lines using the jumper cords 1, the optical connectors 10 are connected to optical connectors, optical adaptors, or the like (not shown) provided in the connection units 4.

On the other hand, unused optical fibers which are not connected to other optical fibers at the moment, that is, the aforementioned jumper cords 1 are held at the panel 3 in preparation for an increase in the number of subscribers (an increase in the number of used communication lines). In this case, each of the holding members 11 collectively holds the jumper cords 1 with the optical connectors 10 (see FIG. 8) attached thereto.

The panel 3 may be provided, for example, on the back of a cover (a door) of the optical distribution frame (an optical distribution box) or may be the cover (door) itself. Alternatively, the panel 3 may be provided on a sidewall constituting the optical distribution frame 2. As described above, in the present invention, the "attachment panel" is a generic term indicating a space where the jumper cords 1 are held or a structure including an area where the jumper cords 1 are held.

A body 14 of each holding member 11 is a resin molded product and formed into a flared tube.

The body 14 includes an upper opening (a first opening) 13 and a lower opening (a second opening) 12 at the top and bottom thereof, respectively. The lower opening 12 is formed into a horizontally long slit. More specifically, the second opening 12 is formed in a horizontally long rectangle composed of short sides 12b and long sides 12a (see FIG. 1(a)). The short sides 12b have such a short length that optical fibers can pass through the lower opening 12 but the optical connectors 10 cannot pass through the lower opening 12. The long sides 12a are sufficiently longer than the short sides 12b. On the other hand, the upper opening 13 is opened wider than the lower opening 12 and has an area sufficiently larger than that of the lower opening 12.

Herein, the meaning of the term "such a narrow width that the optical connectors 10 cannot pass through the lower opening" is described.

In the case of using MU connectors (JIS C5983), SC connectors (JIS C5973), or SC2 connectors (JIS C5973) as the optical connectors, the sizes of the optical connectors are about 4×4 mm, 7×7 mm, or 6×6 mm, respectively. In the case of using optical fiber cords as the optical fibers connected to the optical connectors, the diameter of each optical fiber cord is about 2.8 mm. The length of the short sides 12b not allowing the optical connectors to pass through the second opening 12 is a length which is not more than the aforementioned width of each optical connector and is large enough for the optical fibers connected to the optical connectors to pass through the second opening 12.

As shown in FIG. 1A, the shape of the body 14 viewed from above is rectangular. In other words, the shape of a cross section (a horizontal cross section) of the body 14 parallel to the sheet surface of FIG. 1A is a rectangle. This rectangle is composed of four sidewalls 14a, 14b, 14c, and 14d of the body 14. The two sidewalls 14a and 14b (a first pair of two sidewalls) face each other, and the other two sidewalls 14c and 14d (a second pair of two sidewalls) face each other.

As shown in FIG. 1B, the sidewall 14b is a vertical wall extending in an up-down direction, and the sidewall 14a facing the sidewall 14b is an inclined wall inclined to the vertical wall 14b. The up-down direction indicates a vertical direction on the sheet surface. This up-down direction indicates a vertical direction at a working site where the holding members 11 are attached to the optical distribution frame 2.

The width of the sidewalls 14a and 14b is substantially equal to the length of the long sides 12b of the lower opening 12. On the other side, the width of the sidewalls 14c and 14d is sufficiently wider than the length of the short sides 12b of the lower opening 12. The sidewalls 14c and 14d are parallel to each other.

With such a structure, the horizontal cross-sectional area of the body 14 gradually increases towards the upper opening 13. In other words, the accommodation area of the jumper cords 1 gradually increases towards the upper opening 13.

The body 14 of this embodiment includes a side opening 16 between the sidewalls 14c and 14d, the side opening 16 connecting the lower and upper openings 12 and 13. Accordingly, the part composed of the sidewalls 14a, 14c, and 14d has a cross-section shaped in a squared U shape. The sidewall (a vertical wall) 14b serves as an openable plate-shaped cover 15 and covers the side opening 16 so as to open and close the side opening 16. The cover 15 is joined through hinges 15e to an edge, on the side opening 16 side, of the sidewall 14d. The cover 15 can be opened and closed with respect to the side opening 16 by means of the hinges 15e.

In a part of the cover 15 which comes into contact with the sidewall 14c, lock portions 15c and 15d are formed. By these lock portions 15c and 15d, the cover 15 is engaged with the edge of the sidewall 14c.

In this embodiment, the lock portions 15c and 15d are formed as protrusions extending, in parallel to the cover 15, from a portion of the cover 15 corresponding to the side opening 16. Furthermore, in the lock portions 15c and 15d, engagement holes 15b are formed. At positions of the sidewalls 14c corresponding to the engagement holes 15b and 15b, lock claws 18 protruding from the sidewall 14c are provided. When the cover 15 is closed, the lock claws 18 are inserted into and locked with the engagement holes 15b and 15b, so that the cover 15 is locked with the body 17.

As shown in FIG. 1B, the sidewall 14a is composed of at least an upper inclined surface 14aa and a lower inclined surface 14ab. The slope of the lower inclined surface 14ab with respect to the cover 15 (the sidewall 14b) vertically positioned is smaller than the slope of the upper inclined surface 14aa. In other words, the angle of intersection of a plane including the cover 15 and a plane including the upper inclined surface 14aa is smaller than the angle of intersection of the plane including the cover 15 and a plane including the lower inclined surface 14ab. Reference numeral 14e shown in FIG. 1A indicates a boundary between the upper and lower inclined surfaces 14aa and 14ab, thus indicating a part where the angle of slope of the sidewall 14a to the cover 15 changes.

At part of the periphery of the lower opening 12, guide portions 15a and 14ac facing each other are provided. The guide portions 15a and 14ac are configured to guide the optical fibers. The guide portion 14ac is formed so as to extend downward from the bottom end of the lower inclined surface 14ab and bend outward (leftward in FIG. 1B). The guide portion 15a is formed so as to extend downward from the bottom end of the cover 15 (sidewall 14b) and bend outward (rightward in FIG. 1B). The guide portions 15a and 14ac extend downward so as to be separated from each other.

FIGS. 4 to 7 show the structure of the attachment members 22 on which the holding members 11 are mounted, the structure of the attachment base 20 to which the attachment members 22 are fixed, and the holding members 11 attached to the panel 3 using the attachment members 22.

Figure 4:
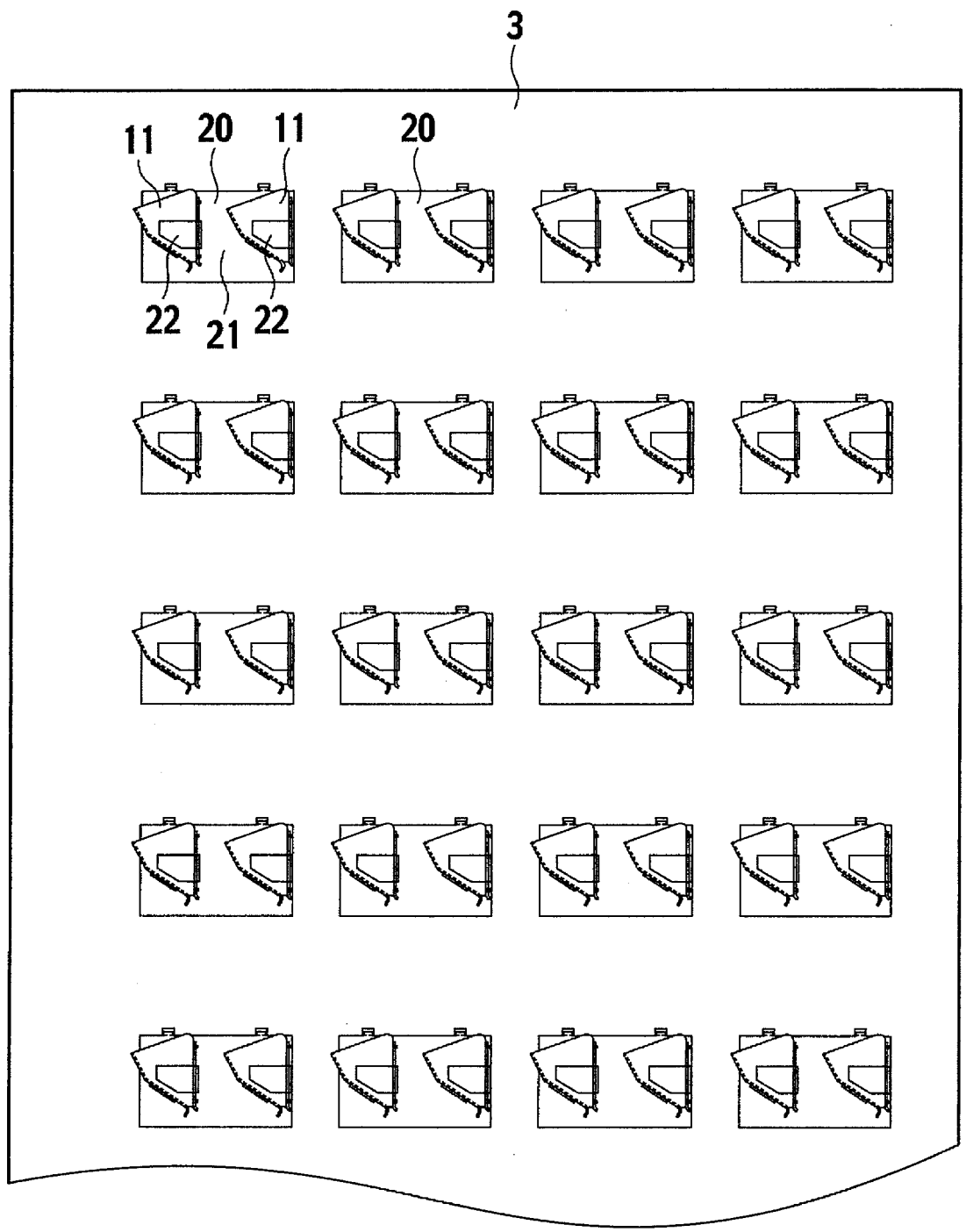
FIG. 4 is an enlarged view of a main portion showing the attachment panel of FIG. 3A in detail.
Figure 5:
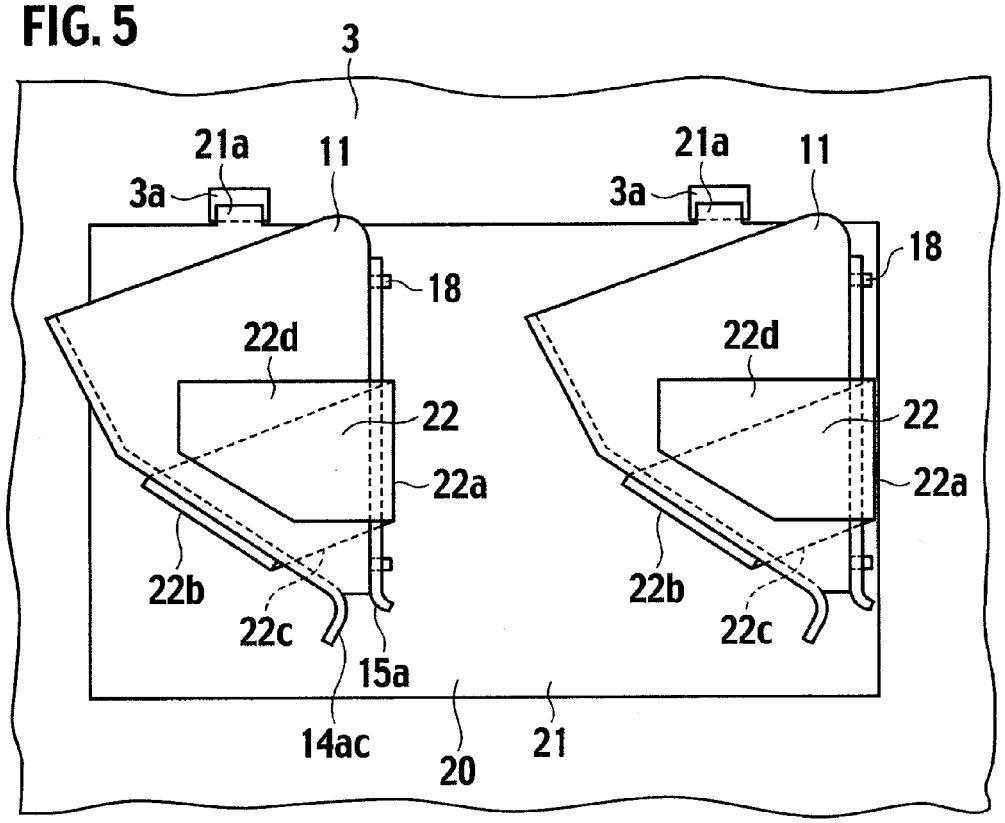
FIG. 5 is an enlarged view of one of attachment bases shown in FIG. 4.
Figure 6:
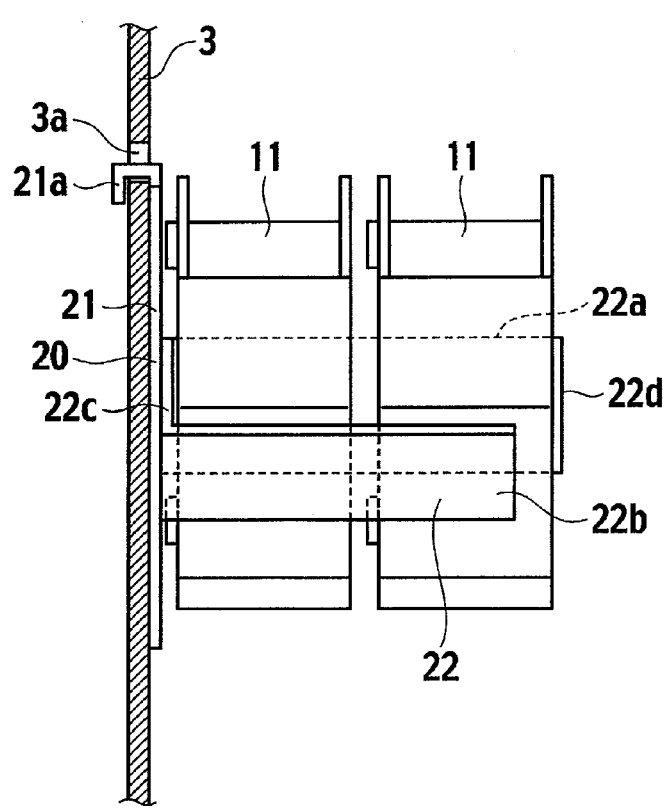
FIG. 6 is a left side view of FIG. 5.
Figure 7:
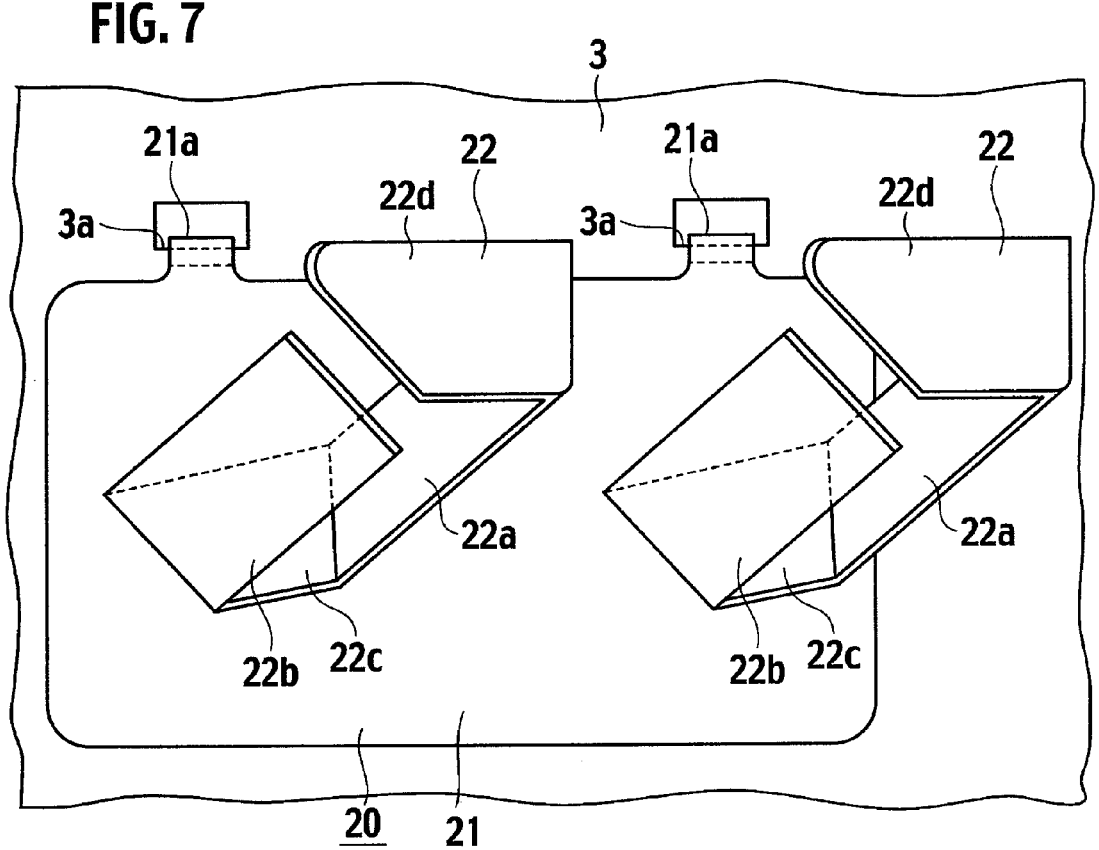
FIG. 7 is a perspective view showing only the attachment base in FIG. 5.

FIG. 4 shows the plurality of holding members 11 attached to the panel 3 in a matrix manner. FIG. 5 is an enlarged view of one of the attachment bases 20 shown in FIG. 4. FIG. 6 is a left side view of FIG. 5. FIG. 7 is a perspective view showing only the attachment base 20 with no holding members 11 mounted thereon.

As shown in the drawings, the holding members 11 are attached to the panel 3 with use of the attachment members 22.

As shown in FIGS. 5 and 7, each of the attachment members 22 includes two plate-shaped support portions 22a and 22b, a bottom plate portion 22c, and a removal prevention portion 22d. The plate-shaped support portions 22a and 22b are configured to support outer surfaces of the cover 15 and lower sidewall 14ab of each holding member 11. The bottom plate 22c connects bases of the plate-shaped support portions 22a and 22b. The removal prevention portion 22d extends from the end of the plate-shaped support portion 22a at right angle to prevent removal of the holding member 11. The bottom plate portion 22c is fixed to the base plate 21. The fixation of the bottom plate portion 22c to the base plate 21 is made by bonding, screwing, or the like.

Each attachment member 22 of this embodiment is configured to accommodate two holding members 11 as shown in FIG. 6. In other words, the plate-shaped support portions 22a and 22b are long enough for the two holding members 11 to be attached thereto.

Each of the attachment bases 20 is detachable from the panel 3 and includes a base plate 21 and hooks 21a provided to the upper edge of the base plate 21. In this embodiment, two of the attachment members 22 are attached to the base plate 21. Each attachment base 20 is attached to the panel 3 by hooking the hooks 21a on rectangular holes 3a opened in the panel 3. As shown in FIGS. 3A to 3C and FIG. 4, the plurality of attachment bases 20 are attached to the panel 3 in a matrix manner.

A description is given of a work of keeping the jumper cords 1 on the panel 3 using the holding members 11 and attachment bases 20.

To perform this work efficiently, specific places of the optical jumper unit 5 to which the jumper cords 1 are connected are numbered. On the other hand, the holding members 11 are numbered corresponding to the numbers of the specific places.

When one of the jumper cords 1 is connected to a specific place in the optical jumper unit 5, the jumper cord 1 is held by the holding member 11 with a number corresponding to the number of the specific place.

To hold the jumper cords 1 at one of the holding members 11, first, the holding member 11 is taken out from the corresponding attachment member 22. The cover 15 of the taken out holding member 11 is opened, and the optical connectors 10 of the jumper cords 1 are accommodated in the holding member 11. Thereafter, the cover 15 is closed and the holding member 11 is put back to the corresponding attachment member 22. As shown in FIG. 8, the optical connectors 10 are accommodated in the holding member 11 with the bodies or protective boots 10a collected together.

To connect the jumper cords 1 accommodated in the holding member 11 to optical adaptors or the like of the connection unit 4, first, a target jumper cord is selected from the plurality of jumper cords 1 laid in the corresponding holding member 11. Subsequently, the selected jumper cord 1 is taken out from the holding member 11 and is again connected to the connection unit 4.

The holding member 11 of this embodiment is tubular and includes the lower opening 12 having an opening area that does not allow the optical connectors to pass through the lower opening 12 and the upper opening 13 having an opening area sufficiently larger than that of the lower opening 12. The holding member 11 is formed into a tube flared so as to open wide toward the upper opening 13 from the lower opening 12. Accordingly, the optical connectors 10 and jumper cords 1 will not be removed from the holding member 11. Furthermore, the space provided with the upper opening 13 can accommodate a number of the optical connectors 10.

According to the holding members 11 of this embodiment, the optical connectors 10 are collected together and held. Accordingly, it is not necessary to insert the optical connectors 10 into holding holes or grooves to hold the optical connectors 10, thus allowing a number of the optical connectors 10 to be accommodated in the limited space.

The optical connectors 10 are generally accommodated facing upward as shown in FIG. 8. Since there are no obstacles such as a wall ahead of (above) the ends of the optical connectors 10, it is not necessary to align the ends of the optical connectors 10 when the optical connectors 10 are accommodated in the holding members 11. Compared to a conventional method of accommodating optical connectors in a box-shaped optical connector holding part, the workability is considerably increased.

Moreover, the holding members 11 hang and hold the jumper cords 1. Accordingly, the base portions of the optical connectors are little subjected to excessive bending force, and there is little possibility of causing a bending loss or damaging optical fibers.

Even when a number of the jump cords 1 are held, each optical connector 10 can be seen. Accordingly, the optical connectors 10 can be individually recognized, thus providing a good workability in holding the jumper cords 1 or switching communication lines.

In the holding members 11 of this embodiment, the sidewall 14a facing the cover 15 is composed of the upper inclined surface 14aa having a steep slope and the lower inclined surface 14ab having a gentle slope. The lower inclined surface 14ab widens the upper space corresponding to the upper inclined surface 14aa to increase the number of optical connectors 10 which can be accommodated. The upper inclined surface 14aa allows the optical connectors 10 to be reliably held in the holding member 11. In this case, the collected optical connectors 10 face in the directions not greatly different from each other and are therefore collected together in an orderly fashion.

The lower opening 12 is provided with the lower opening guide portions 14ac and 15a bent outward. Accordingly, it is possible to prevent the jumper cords 1 from being subjected to local bending force at the lower opening 12.

The holding members 11 can be attached or detached from the attachment members 22 with a simple operation of just inserting the holding members 11 downward into the attachment members 22 or pulling the holding members 11 upward from the attachment members.

As described above, when one of the jumper cords 1 is held on the panel 3, the corresponding holding member 11 is detached from the corresponding attachment member 22. Next, the jumper cord 1 is accommodated in the holding member 11, and the holding member 11 is again attached to the attachment member 22. Accordingly, the holding work can be performed well.

Moreover, each attachment base 20 holds two of the attachment members 22. Furthermore, each attachment member 22 holds two of the holding members 11. Accordingly, four of the holding members 11 can be attached to each attachment base 20, and a large number of the holding members 11 can be attached or detached from the panel 3 easily and efficiently.

The attachment member 22 is not limited to the structure accommodating the two holding members 11. The attachment member 22 may have a structure which can accommodate one holding member 11 or three or more holding members 11.

Moreover, the attachment members 22 of this embodiment may be configured to be directly attached to the panel 3. Furthermore, the holding members 11 of this embodiment may be configured to be directly attached to the panel 3.

Second Embodiment

Figure 9:
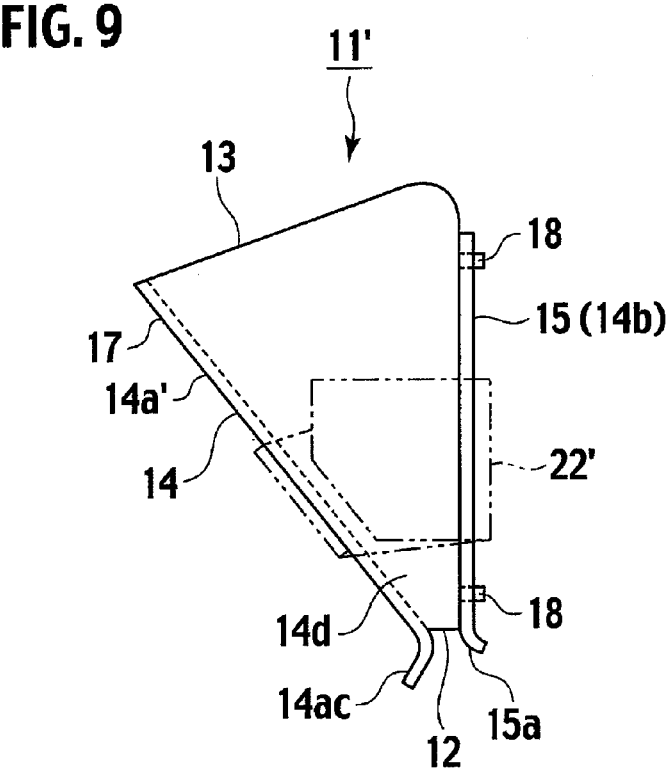
FIG. 9 is a front view of a holding member according to a second embodiment of the present invention.

FIG. 9 shows a holding member 11' according to a second embodiment of the present invention.

As shown in FIGS. 1 and 2, the sidewall 14a of the first embodiment includes two different slopes of the upper and lower inclined surfaces 14aa and 14ab. However, in the holding member 11' of this embodiment, a sidewall 14a' facing the cover 15 includes not two inclined surfaces but one inclined surface.

Since the other constitution of this embodiment is similar to that of the holding member 11 of the first embodiment, similar parts thereof are given the same reference numerals and symbols, and a description thereof is omitted. An attachment member 22' used to attach the holding member 11' is indicated by a dashed-dotted line.

Third Embodiment

Figure 10:
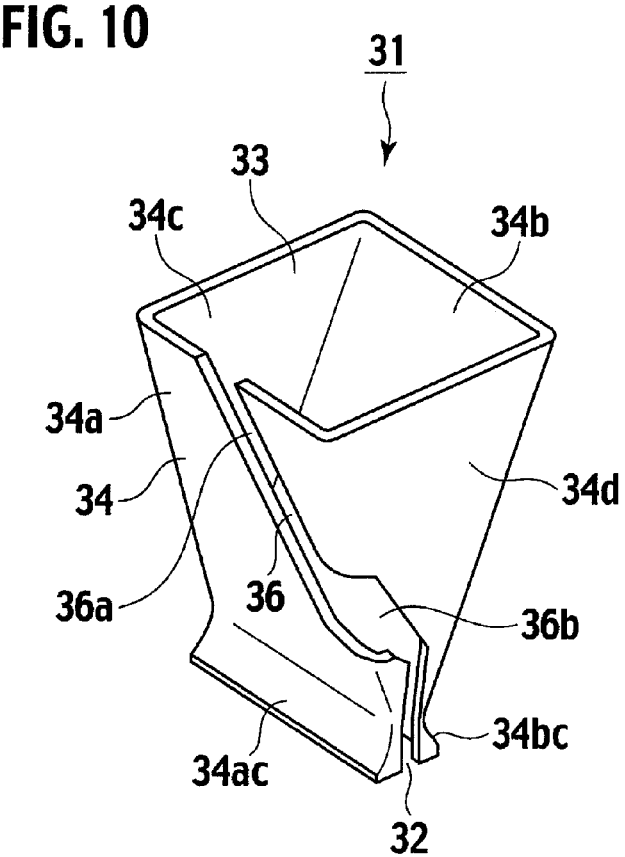
FIG. 10 is a perspective view of a holding member according to a third embodiment of the present invention.
Figure 11:
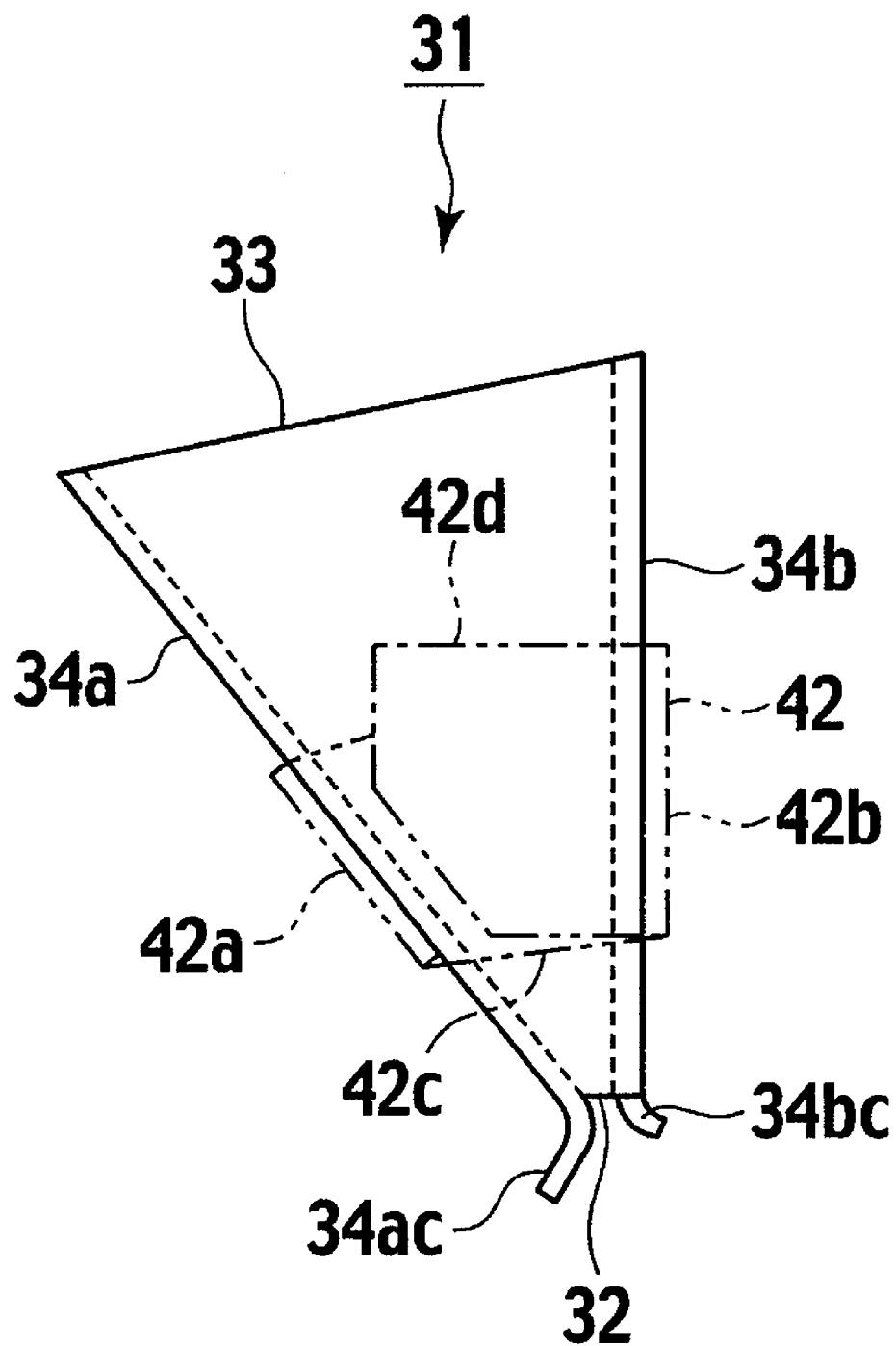
FIG. 11 is a front view of the holding member of FIG. 10.

FIGS. 10 and 11 show a holding member 31 according to a third embodiment of the present invention. A body 34 of the holding member 31 is an integrally molded resin product. The body 34 includes an upper opening (a first opening) 33 at the top, and a lower opening (a second opening) 32 at the bottom. The body 34 is formed in a tube flared so as to be opened wide from the lower opening 32 toward the upper opening 33. The flared shape of the body 34 is composed of sidewalls 34a, 34b, 34c, and 34d.

The lower opening 32 is formed into a rectangle having short sides that do not allow the optical connectors 10 to pass through the lower opening 32 and long side sufficiently longer than the short side.

The upper opening 33 is formed into a rectangle and has an opening area sufficiently larger than the opening area of the lower opening 32. The length of the long sides of the upper opening 33 is equal to that of the long sides of the lower opening 32. The short sides of the upper opening 33 are sufficiently longer than the short sides of the lower opening 32.

The sidewalls 34a and 34b face each other in a direction that the short sides of the lower opening 32 extend (in a horizontal direction of FIG. 11). The sidewalls 34a and 34b are provided so that the distance therebetween increases toward the upper opening 33. The sidewall 34b is a vertical wall extending in an up-down direction, and the sidewall 34a is an inclined wall inclined to the vertical wall 34b. The sidewall 34a has an inclined surface similar to the sidewall 14a' of the second embodiment.

The sidewalls 34c and 34d face each other in a direction that the long sides of the lower opening 32 extend. The sidewalls 34c and 34d are provided in parallel to each other. Accordingly, the body 34 has a rectangular cross-section viewed from above.

At the bottom end of the lower opening 32, the sidewall 34a and 34b extend downward and curved outward to form guide portions 34ac and 34bc. The guide portions 34ac and 34bc prevent optical fibers from locally bending.

The body 34 includes a slit opening 36 as a side opening allowing the jumper cords 1 to be accommodated sideways in the holding member 31. The slit opening 36 connects the lower and upper openings 32 and 33 and is provided for at least one of the sidewalls 34a, 34c, and 34d.

The slit opening 36 is substantially inclined as a whole to the up-down direction (the vertical direction in FIG. 11) from the lower opening 32 to the upper opening 33. For example, as shown in FIG. 10, the slit opening 36 extends downward from the upper end of the sidewall 34a to reach the sidewall 34d and vertically extends down the sidewall 34d to reach the lower end thereof.

The slit opening 36 includes a narrow portion (a constricted portion) 36a in a part thereof in the extending direction and includes a wide portion 36b in the other part. The narrow portion 36a has such a width that optical connectors can pass through the narrow portion 36a but optical fibers cannot pass through the narrow portion 36a. The wide portion 36b is wider than the narrow portion 36a.

The wide portion 36b shown in FIG. 10 is provided to the sidewall 34a including the narrow portion 36a and extends in the sidewall 34d adjacent thereto. The wide portion 36a has a wide opening on the lower opening 32 side.

The body 34 of the third embodiment does not include the side opening 16 and the cover 15 closing the side opening 16 of the first and second embodiments. However, the other constitution is similar to those of the holding members 11 and 11'.

An attachment member 42 used to attach the holding member 31 to the panel 3 is indicated by a two-dot chain line in FIG. 11. The structure of the attachment member 42 is basically similar to the attachment member 22 shown in FIG. 7. The attachment member 42 includes two support portions 42a and 42b, a bottom plate portion 42c, and a removal prevention portion 42d. The support portions 42a and 42b receive the sidewalls 34a and 34b. The bottom plate portion 42c connects bases of the plate-shaped support portions 42a and 42b to each other. The removal prevention portion 42d extends from the end of the plate-shaped support portion 42a at right angles to prevent removal of the holding member 31. The attachment member 42 is fixed to a base plate of an attachment base by the bottom plate portion 42c.

In this embodiment, the jumper cords 1 are accommodated in the holding member 31 through the slit opening 36.

The slit opening 36 is bent as shown in FIG. 10. Accordingly, the jumper cords 1 accommodated inside the holding member 31 will not easily slip off to the outside through the slit opening 36.

Moreover, when the holding member 31 is attached to the attachment member 42, the slit opening is closed by the plate-shaped support portion 42a of the attachment member 42, and the optical fibers 1 inside the holding member 31 can be prevented from being removed.

The holding member 31 includes the slit opening 36 as a side opening used to accommodate the jumper cords 1 sideways into the holding member 31 and does not include a cover. Accordingly, the shape of the holding member 31 is simple, and the holding member 31 can be manufactured at low cost.

The holding member 31 of the present invention includes, in the body thereof, the elongated lower opening wide enough for the optical fibers to pass through but too narrow for the optical connectors to pass through, and the upper opening sufficiently wider than the lower opening.

The holding member of the present invention is formed into a flared tube as a whole. The lower part of the holding member is narrowed, and the space on the upper opening side is wide. Accordingly, it is possible to ensure a space for a large number of optical connectors.

The holding member of the present invention holds the partly gathered optical connectors in the space on the upper opening side. Accordingly, the holding member can hold a larger number of optical connectors than the conventional holding member where the optical connectors are inserted and held in holding holes or grooves.

When the optical distribution frame of the present invention is installed, the optical connectors are accommodated facing upward in the vertical direction. Accordingly, there is no obstacles such as a wall ahead of the tip ends of the optical connectors. To accommodate the optical connectors together in the holding member, it is not necessary to align the tip ends of the optical connectors, thus a good workability is obtained.

Moreover, the optical connectors are accommodated in the holding member facing substantially upward in the vertical direction, and naturally hang down from the holding member. In other words, the optical fibers are little subjected to excessive bending force at the bases of the optical connectors. It is therefore possible to prevent damage or bending loss of the optical fibers due to holding of the optical fibers.

Moreover, even when unused optical fibers are accommodated in the holding member, the optical connectors are exposed from the upper opening. Accordingly, it is possible to easily check the numbers of the individual optical connectors and the like.

The unused optical fibers are accommodated in the holding member through the sidewall of the holding member, that is, through the side opening which is provided for the sidewall and connects the lower and upper openings.

To prevent unused optical fibers accommodated in the holding member from being removed, the cover is provided to the side opening. The cover is openable. The width of the second opening is small enough to prevent optical connectors from passing through the second opening. Therefore, when the cover is closed after the unused optical fibers are accommodated, the unused optical fibers is not removed from the holding member.

Instead of the provision of the cover, the side opening, which is a slit-shaped narrow opening, may be provided. This slit-shaped narrow opening can prevent optical connectors from being removed. The slit has a simple shape and does not require any additional components. The slit-shaped opening can be manufactured at lower cost than the holding member with a cover. By making at least a part of the slit wide enough for the optical fibers to pass through but too narrow for the optical connectors to pass through, unused optical fibers with optical connectors which are accommodated in the holding member can be prevented from being removed through the side opening. Especially by bending the slit-shaped opening in the middle, the removal of the unused optical fibers can be more effectively prevented.

According to the structure where the sidewall facing the cover is composed of the upper inclined surface having a steep slope with respect to the cover vertically positioned and the lower inclined surface having a gentle slope with respect to the cover, the upper space corresponding to the upper inclined surface is made wide, and the number of optical connectors which can be accommodated can be increased. Moreover, the optical connectors collected in upper part of the holding member face in directions not greatly different, thus allowing the optical connectors to be collected in an orderly fashion.

The lower opening is provided with the guide portion (the curved portion) for the lower opening which is curved outward. This can prevent unused optical fibers from being subjected to excessive bending force at the lower opening.

What is claimed is:

1. A holding member for holding a plurality of optical fibers provided respectively with optical connectors within an optical distribution frame, comprising:
    a tubular body including:
        a first opening configured to allow the optical fibers to pass through the first opening;
        a second opening having an opening area smaller than that of the first opening; and
        a side opening connecting the first and second openings; wherein
    the tubular body is flared to have an accommodation area for the optical fibers increasing from the second opening towards the first opening, and
    the second opening has a width smaller than that of each of the optical connectors.

2. The holding member according to claim 1, wherein
    the tubular body is composed of four sidewalls,
    the four sidewalls are provided to define a cross-section of the tubular body into a rectangle,
    among the four sidewalls, a first pair of the two sidewalls face each other and have a width equal to a length of long sides of the second opening,
    among the four sidewalls, a second pair of the two sidewalls face each other and have a width larger than a length of short sides of the second opening,
    distance between the first pair of two sidewalls increases from the second opening towards the first opening, and
    distance between the second pair of two sidewalls is constant.

3. The holding member according to claim 2, wherein
    one of the first pair of two sidewalls is a vertical wall vertically extending, and
    the other of the first pair of two sidewalls is an inclined wall inclined to the vertical wall.

4. The holding member according to claim 3, wherein
    the inclined wall includes an upper inclined surface and a lower inclined surface formed integrally with the upper inclined surface, and
    an angle of intersection of a plane including the vertical wall and a plane including the upper inclined surface is smaller than an angle of intersection of the plane including the vertical wall and a plane including the lower inclined surface.

5. The holding member according to claim 3, further comprising:
    a hinge portion that is provided between a sidewall of the second pair of two sidewalls and the vertical wall and that opens and closes the vertical wall with respect to the side opening, and
    a lock portion locking the other sidewall of the second pair of two sidewalls and the vertical wall.

6. The holding member according to claim 5, wherein
    the lock portion includes:
        an engagement hole that is formed in the vertical wall; and
        a lock claw that is provided to the other sidewall of the second pair of two sidewalls and that is locked with the engagement hole.

7. The holding member according to claim 1, wherein the side opening is a slit inclined to the vertical direction.

8. The holding member according to claim 1, wherein
    each of the first pair of two sidewalls includes a guide portion at a bottom thereof; and
    the guide portions face each other and extend downward while bending outward.

9. An optical distribution frame, comprising a holding space where the holding member according to claim 1 is fixed.

10. A holding member for holding a plurality of optical fibers provided respectively with optical connectors, comprising:
    a tubular body including:
        a first opening configured to allow the optical fibers to pass through the first opening;
        a second opening having an opening area smaller than that of the first opening; and
        a side opening which is provided to a sidewall of the tubular body and connects the first and second openings; and
    a cover closing the side opening, wherein
    the tubular body is flared to have an accommodation area for the optical fibers increasing from the second opening towards the first opening, and
    the second opening has a width smaller than that of each of the optical connectors.

11. An optical distribution frame, comprising a holding space where the holding member according to claim 10 is fixed.

12. A holding member for holding a plurality of optical fibers provided respectively with optical connectors, comprising:
    a tubular body including:
        a first opening configured to allow the optical fibers to pass through the first opening;
        a second opening having an opening area smaller than that of the first opening; and a side opening which is provided to a sidewall of the tubular body and connects the first and second openings; wherein the tubular body is flared to have an accommodation area for the optical fibers increasing from the second opening towards the first opening, at least a part of the side opening is a narrow portion having an opening width which is smaller than a width of each of the optical connectors and larger than a diameter of each of the optical fibers, and the second opening has a width smaller than that of each of the optical connectors.

13. An optical distribution frame, comprising a holding space where the holding member according to claim 12 is fixed.

* * * * *